Patented Nov. 21, 1939

2,180,936

UNITED STATES PATENT OFFICE 2,180,936

RUBBER COMPOSITION AND METHOD OF PRESERVING RUBBER

Raymond F. Dunbrook, Akron, Ohio, assignor to The Firestone Tire & Rubber Company, Akron, Ohio, a corporation of Ohio No Drawing. Application July 1, 1938,
Serial No. 217,051

18 Claims. (Cl. 260—809)

This invention relates to the art of preserving rubber and rubber-like substances, and more especially it relates to the preparation of unvulcanized or vulcanized rubber compositions which resist deterioration due to aging.

This specification is a continuation in part of copending application, Serial No. 747,711, filed October 10, 1934.

The invention is of primary utility in the manufacture of carbon black rubber compositions, such as tire tread stocks, that are subject to light, heat, oxidation, abrasion, flexing and other destructive agencies during use.

The chief objects of the invention are to provide a class of materials suitable for incorporating in rubber or rubber-like compositions to retard deterioration thereof; to provide rubber composition having superior aging qualities; to improve the flexing qualities of carbon black rubber stocks whereby the formation of cracks is retarded; and to achieve the foregoing objects at relatively low cost. Other objects will be manifest as the specification proceeds.

According to this invention, a new class of anti-oxidants or age-resisters has been found which, upon incorporating in a rubber stock, imparts exceptional age-resisting qualities to the vulcanized rubber product. The compounds herein disclosed as imparting such antioxidant properties to vulcanized rubber comprise (a) the reaction product of a hydrocarbon of the terpene series such as, for example, alphapinene, limonene, camphene, terpinolene, terpinene, and the like, with an aryl secondary amine such as, for example, diphenylamine; (b) the reaction product of a hydroxy derivative of a hydrocarbon of the terpene series such as, for example, terpineol, fenchyl alcohol, borneol, terpinyl alcohol and the like with an aryl primary or secondary amine such as, for example, aniline, para-toluidine, para-butylaniline, para-phenetidine, alpha-naphthylamine, beta-naphthylamine, or diphenylamine; such condensation products being essentially secondary amines. These reaction products have been successfully prepared by the utilization of a catalyst such as zinc chloride, iodine, hydrochloric acid, the hydrochloride of the reacting amine, or a mixture of such catalysts. It is to be understood that other substances having the same effect in these reactions as the catalysts just mentioned may be employed and no claim is made to such catalysts, as the present invention relates to the combination of the reaction product with rubber and not to the method of reacting the terpene derivatives and amines to produce the reaction product.

The following are understood to be illustrative embodiments of the invention and are not limitative of the scope thereof.

EXAMPLE I

The reaction product of substantially one molecular proportion of alpha-pinene and substantially one molecular proportion of a secondary amine, namely, diphenylamine, was prepared as follows: 53.0 grams of alpha-pinene, 47.5 grams of diphenylamine and 5.0 grams of anhydrous zinc chloride were heated at atmospheric pressure for approximately 5 hours at about 150°–160° C. Alternatively, other catalysts such as hydrochloric acid or iodine may be used. After cooling the reaction mixture to room temperature, it was extracted with sodium hydroxide either in the presence of a solvent such as benzene or without the aid of a solvent. The extracted product was washed with water, and after removal of all zinc chloride was dried and distilled in vacuo to remove any unreacted diphenylamine.

The product remaining after distillation was a syrupy material, and it was incorporated in a tread stock hereinafter designated Formula B. A similar formula (Formula A) with the exception that it did not include the reaction product of alpha-pinene and diphenylamine as an antioxidant was prepared for use as a control. Formula A and Formula B comprised—

| Ingredient | Formula A | Formula B |
|---|---|---|
|  | Parts | Parts |
| Smoked sheet rubber | 100 | 100 |
| Sulfur | 3 | 3 |
| Zinc oxide | 5 | 5 |
| Carbon black | 45 | 45 |
| Pine tar | 3 | 3 |
| Stearic acid | 3 | 3 |
| Mercapto-benzo-thiazole | 1.25 | 1.25 |
| The reaction product of alphapinene and diphenylamine | 0 | 1.0 |

The rubber stocks thus compounded were vulcanized in the usual manner, under a steam pressure of 23 pounds (264° F.). Test strips of the cured stock were artificially aged in the oxygen bomb for 46 hours at a temperature of 70° C. under a pressure of 300 pounds per square inch. The test data obtained on the aged and unaged rubber stocks follow in Table I.

*Table I*

| Formula | Cure | | | Modulus of elasticity in lbs./in.² at elongation of 400% | Tensile at break in lbs./in.² |
|---|---|---|---|---|---|
| | Mins. | Pounds steam pressure | Hours aged | | |
| A | 120 | 23 | 0 | 2950 | 4225 |
| B | 120 | 23 | 0 | 3050 | 4450 |
| A | 140 | 23 | 0 | 3000 | 4275 |
| B | 140 | 23 | 0 | 3050 | 4475 |
| A | 120 | 23 | 46 | 2275 | 2275 |
| B | 120 | 23 | 46 | 2750 | 3350 |
| A | 140 | 23 | 46 | 2175 | 2175 |
| B | 140 | 23 | 46 | 2700 | 3125 |

EXAMPLE II

The reaction product of substantially one molecular proportion of terpineol (a terpene alcohol) and substantially four molecular proportions of aniline was prepared as follows: 154 grams of terpineol were mixed with 372 grams of aniline and 130 grams of aniline hydrochloride, and the mixture was heated in a round-bottom flask connected to a reflux condenser for 5 hours in an oil bath maintained at approximately 185° C. The refluxing was then interrupted and the reaction mixture allowed to cool. Four hundred grams of a 10% solution of sodium hydroxide were then added to the contents of the flask and the mixture was well shaken to liberate the bases (aniline and the reaction product) from their hydrochlorides. The mixture was then transferred to a separatory funnel, and, after the two layers had separated, the water layer was drawn off. The oil contained the excess aniline and the condensation product of terpineol with aniline. The aniline was removed by distillation at atmospheric pressure. After removal of the aniline the residue was vacuum-distilled, and the product, boiling at 160° to 180° at 4 mm. pressure, was collected. The reaction product was incorporated in a tread stock, designated Formula D, that was similar to Formula B of Example I except for the antioxidant employed. A control stock, designated Formula C, was prepared, which control stock was identical with Formula A.

The rubber stocks thus compounded were vulcanized and test pieces of the cured stock were artificially aged in the manner hereinbefore described. A comparison between the aged and unaged rubber products is given in Table II.

*Table II*

| Formula | Mins. | Cure pounds steam pressure | Hours aged | Modulus of elasticity in lbs./in.² at elongation of 400% | Tensile at break in lbs./in.² |
|---|---|---|---|---|---|
| C | 120 | 23 | 0 | 2200 | 4450 |
| D | 120 | 23 | 0 | 2375 | 4700 |
| C | 140 | 23 | 0 | 2250 | 4400 |
| D | 140 | 23 | 0 | 2475 | 4375 |
| C | 120 | 23 | 46 | 1425 | 1500 |
| D | 120 | 23 | 46 | 2225 | 3100 |
| C | 140 | 23 | 46 | 1450 | 1525 |
| D | 140 | 23 | 46 | 2275 | 3125 |

From the specific examples hereinbefore set forth, it is shown that the new class of antioxidants imparts desirable age-resisting qualities to vulcanized rubber tread stocks, so that such stocks when subjected to aging undergo but a relatively small loss in tensile strength.

It is understood that practice of the invention is not limited to the specific compositions given, such compositions merely being illustrative of the manner of utilizing the antioxidants or age-resistors of the invention. The said antioxidants or age-resistors may be employed in combination with vulcanizing agents other than those herein disclosed, for the invention is applicable to rubber compositions of a varied nature, as well as to other rubber-like substances.

The precise proportions of the materials employed may be varied, and other materials having equivalent chemical properties may be employed if desired without departing from the spirit and scope of the invention as defined by the appended claims.

What is claimed is:

1. The method of retarding the deterioration of rubber which comprises treating rubber with an amine selected from the group consisting of the product of the reaction of a terpene hydrocarbon with a secondary aryl amine and the product of the reaction of a hydroxy derivative of a terpene hydrocarbon with an amine selected from the group consisting of primary and secondary aryl amines.

2. The method of improving the properties of rubber which comprises vulcanizing rubber in the presence of an amine selected from the group consisting of the product of the reaction of a terpene hydrocarbon with a secondary aryl amine and the product of the reaction of a hydroxy derivative of a terpene hydrocarbon with an amine selected from the group consisting of primary and secondary aryl amines.

3. The method of retarding the deterioration of rubber which comprises treating rubber with an amine formed by the reaction of a terpene hydrocarbon with a secondary aryl amine.

4. The method of improving the properties of rubber which comprises vulcanizing rubber in the presence of an amine formed by the reaction of a terpene hydrocarbon with a secondary aryl amine.

5. The method of retarding the deterioration of rubber which comprises treating rubber with an amine formed by the reaction of alpha-pinene with diphenylamine.

6. The method of improving the properties of rubber which comprises vulcanizing rubber in the presence of an amine formed by the reaction of alpha-pinene with diphenylamine.

7. The method of retarding the deterioration of rubber which comprises treating rubber with an amine formed by the reaction of a hydroxy derivative of a terpene hydrocarbon with a primary aryl amine.

8. The method of improving the properties of rubber which comprises vulcanizing rubber in the presence of an amine formed by the reaction of a hydroxy derivative of a terpene hydrocarbon with a primary aryl amine.

9. The method of retarding the deterioration of rubber which comprises treating rubber with an amine formed by the reaction of terpineol with aniline.

10. The method of improving the properties of rubber which comprises vulcanizing rubber in the presence of an amine formed by the reaction of terpineol with aniline.

11. The method of retarding the deterioration of rubber which comprises treating rubber with an amine formed by the reaction of a hydroxy derivative of a terpene hydrocarbon with a secondary aryl amine.

12. The method of improving the properties of rubber which comprises vulcanizing rubber in the presence of an amine formed by the reaction of a hydroxy derivative of a terpene hydrocarbon with a secondary aryl amine.

13. A rubber composition comprising an amine selected from the group consisting of the product of the reaction of a terpene hydrocarbon with a secondary aryl amine and the product of the reaction of a hydroxy derivative of a terpene hydrocarbon with an amine selected from the group consisting of primary and secondary amines.

14. A rubber composition comprising an amine formed by the reaction of a terpene hydrocarbon with a secondary aryl amine.

15. A rubber composition comprising an amine formed by the reaction of alpha-pinene with diphenylamine.

16. A rubber composition comprising an amine formed by the reaction of a hydroxy derivative of a terpene hydrocarbon with a primary aryl amine.

17. A rubber composition comprising an amine formed by the reaction of terpineol with aniline.

18. A rubber composition comprising an amine formed by the reaction of a hydroxy derivative of a terpene hydrocarbon with a secondary aryl amine.

RAYMOND F. DUNBROOK.